US012320424B2

(12) United States Patent
Zhang

(10) Patent No.: US 12,320,424 B2
(45) Date of Patent: Jun. 3, 2025

(54) LIFTING MECHANISM FOR BELT TYPE PUMPING UNIT

(71) Applicant: Apex Oilfield Equipment (Qingdao) Co., Ltd., Qingdao (CN)

(72) Inventor: Cong Zhang, Qingdao (CN)

( * ) Notice: Subject to any disclaimer, the term of this patent is extended or adjusted under 35 U.S.C. 154(b) by 0 days.

(21) Appl. No.: 17/641,995

(22) PCT Filed: Jan. 19, 2021

(86) PCT No.: PCT/IB2021/000009
§ 371 (c)(1),
(2) Date: Mar. 10, 2022

(87) PCT Pub. No.: WO2021/148876
PCT Pub. Date: Jul. 29, 2021

(65) Prior Publication Data
US 2025/0122922 A1 Apr. 17, 2025

(51) Int. Cl.
*F16H 7/14* (2006.01)
*F16G 13/06* (2006.01)
(Continued)

(52) U.S. Cl.
CPC ............... *F16H 7/14* (2013.01); *F16G 13/06* (2013.01); *F16G 15/04* (2013.01); *F16H 7/06* (2013.01)

(58) Field of Classification Search
CPC .... F16H 7/06; F16H 2019/0686; F16H 55/30; F16G 13/06; F16G 13/18; F16G 15/04
See application file for complete search history.

(56) References Cited

U.S. PATENT DOCUMENTS 2,107,498 A 2/1938 Porter
2,756,602 A 7/1956 Blackburn
(Continued)

FOREIGN PATENT DOCUMENTS

CN 1179510 4/1998
CN 1159514 7/2004
(Continued)

OTHER PUBLICATIONS

CTS Transmit Force Drive Future; Jul. 26, 2024; Simplex, Duplex, Triplex and Multiplex Roller Chains; p. 2 (Year: 2024).*
(Continued)

*Primary Examiner* — Bobby Rushing, Jr.
(74) *Attorney, Agent, or Firm* — Kenneth H. Jack; Davis & Jack, LLC

(57) ABSTRACT

An assembly for balancing torsion forces within a long stroke oil pumping rig's roller trolley, the assembly incorporating an axle having forward and rearward ends, wherein the roller trolley is mounted rotatably upon the axle's forward end; a knuckle fixedly attached to the rearward end of the axle, the knuckle incorporating forward and rearward "C" brackets; a forward chain drive assembly, the knuckle's forward "C" bracket operatively engaging the forward chain drive assembly; a lever arm fixedly attached to and extending rearwardly from the knuckle's forward "C" bracket, wherein the lever arm is fixedly attached to or formed wholly with the knuckle's forward "C" bracket; and a rearward chain drive assembly operatively engaged by the knuckle's rearward "C" bracket.

15 Claims, 13 Drawing Sheets

(51) Int. Cl.
*F16G 15/04* (2006.01)
*F16H 7/06* (2006.01)

(56) References Cited

U.S. PATENT DOCUMENTS

| | | | | |
|---|---|---|---|---|
| 3,538,777 | A | 11/1970 | Bender | |
| 4,187,680 | A | 2/1980 | Sanford | |
| 4,432,706 | A | 2/1984 | Gilbertson | |
| 4,665,761 | A | 5/1987 | Bao | |
| 4,879,977 | A * | 11/1989 | Restelli | F01L 1/02 123/90.31 |
| 5,063,792 | A | 11/1991 | Dartnall et al. | |
| 5,116,283 | A * | 5/1992 | Futami | F16H 7/06 474/84 |
| 5,246,076 | A | 9/1993 | Watson | |
| 5,309,992 | A | 5/1994 | Watson | |
| 5,375,657 | A | 12/1994 | Shi et al. | |
| 9,709,130 | B2 * | 7/2017 | Botez | F16H 7/06 |
| 9,927,012 | B2 * | 3/2018 | Chicurel Y Uziel | F16H 37/02 |
| 10,093,413 | B2 * | 10/2018 | Didey | B64C 25/34 |
| 10,113,544 | B2 | 10/2018 | Robison | |
| 10,113,622 | B2 * | 10/2018 | Morris | F16H 35/06 |
| 10,196,883 | B2 | 2/2019 | Robison et al. | |
| 10,197,050 | B2 | 2/2019 | Robison et al. | |
| 10,400,761 | B2 * | 9/2019 | Robison | F04B 49/20 |
| 2014/0234126 | A1 | 8/2014 | Wu | |
| 2015/0071794 | A1 | 5/2015 | Zupanick | |
| 2019/0113104 | A1 * | 4/2019 | Yoon | F16G 13/20 |

FOREIGN PATENT DOCUMENTS

| | | |
|---|---|---|
| CN | 203655247 | 6/2014 |
| CN | 203978393 | 12/2014 |
| CN | 102733782 | 5/2015 |
| CN | 204419133 | 6/2015 |
| CN | 106930731 | 7/2017 |
| CN | 111156297 | 5/2020 |
| CN | 211648945 | 10/2020 |
| WO | WO2004001184 | 12/2003 |

OTHER PUBLICATIONS

“Rotaflex® Long Stroke Pumping Units” academia edu (2014) https://docplayer.net/24088081-Rotaflex-long-stroke-pumping-units-proven-technology-for-deep-challenging-and-high-volume-wells.html.

“Long Stroke Pumping Unit Driven by Low-Speed Permanent Magnet Synchronous Motor” researchgate.net (2019 https://www.researchgate.net/publication/304233795_Long_Stroke_Pumping_Uni_Driven_by_Low_Speed_Permanent_Magnet_Synchronous_Motor/link/5d1af8d8a6fdcc2462b7467c/download.

“New Generation Long Stroke Pumping Units” img1.wsimg.com (2018) https://img1.wsimg.com/blobby/go/c8c297db-8e0d-4484-9c1a-fa38cff36947/downloads/Forland%20Services%20LLC%20Long%20Stroke%20Pumping%20Unit%20.pdf?vers=1586183286237.

* cited by examiner 500A
800A
600A
800A
400A
6200
6000
6300
3600
3000
1000A
2100A
6300
6100
500A
6200
500
4800
4800

6600
6500
200A
2800A
3000
1000A
1600A
800A
2800A
6400
6500
400A
6200
6700
7500
7400
4800
7600
6800

200A
2800A
2000A
3000
3200
400A
2900
2400A
2100A
1800A
6200
1000A
3900
1800A
4100
3400
3600
3800
2600A
6000
1600A
2200A
2800A
800A
600A
500A
6300
400A
6200

LIFTING MECHANISM FOR BELT TYPE PUMPING UNIT

The Applicant herein claims the benefit of International Patent Application No. PCT/US2021/13943, entitled "Lifting Mechanism for Belt-Type Pumping Unit", filed in the USPTO PCT world filing office on Jan. 19, 2021. The Applicant further claims the benefit of International Patent Application No. PCT/IB2021/000009, entitled "Lifting Mechanism for Belt-Type Pumping Unit", said '009 application constituting a transfer of the above referenced '943 application from the U.S. Office to the International Bureau PCT world filing office on or about Feb. 8, 2021. The Applicant further claims the benefit of China National application No. 202020142997.5, entitled "Lifting Mechanism for Belt-Type Pumping Unit", filed in the CNIPA on Jan. 21, 2020, said '997.5 application constituting the priority filing claimed in said '943 and '009 international applications. The Applicant of the instant application and that of said '943, '009, and '997.5 applications are one and the same entity, and the inventor of the instant application is named as an inventor in each of said '943, '009, and '997.5 applications.

TECHNICAL FIELD

The mechanisms and assemblies which are the subject of the instant application and of patents issuing therefrom relate to the field of pumping machinery technologies, and in particular to a lifting mechanism for a belt-type pumping unit. Such units are alternatively called long stroke wellhead oil pumping rigs. An example of such machinery is described in U.S. Pat. No. 4,916,959 entitled "Long Stroke Well Pumping Unit With Carriage" issued Apr. 17, 1990, to Mr. Gordon R. Lively. More particularly, the instant invention relates to power transfer linkages which span between and interconnect such rig's vertically traveling counterweight, and such rig's motive source of rotary power.

BACKGROUND

At present, there are two oil extraction methods, namely flowing oil extraction and mechanical oil extraction. The flowing oil extraction method ejects oil out of the ground as a result of pressure within an oil well, such method often being used in a newly exploited oil field. With continuous exploitation of an oil field, the downhole pressure typically decreases until pressure actuated oil extraction becomes unavailable. In such oil fields, mechanical devices are commonly used for oil pumping.

A commonly used beam pump unit has a simple structure which is easy to manufacture and is convenient to maintain, such units being widely used in oil fields. However, in a deep well having high proportions of thick oil, condensate oil and oil sand, beam pumps often have difficulty efficiently raising the oil due to such pump's relatively short stroke and lengthy stroke times. Accordingly, deep wells give rise to a need for a pumping unit having a long stroke and a low stroke time.

In order to meet the demands of deep oil wells, pumping units as described in Lively '959, namely belt-type or long stroke pumping units, have been developed. The emergence of the belt-type pumping unit has provided a solution to oil extraction problems arising in deep wells and thick oil wells. However, some key weight bearing and lifting components of known belt-type pumping units have shortcomings such as short service life and poor stability due to deficiencies in the structure and design of the pumping unit's continuous loop chain lift assembly. In a belt-type pumping unit, a chain lifting mechanism upwardly lifts and guides the downward travel of a vertically reciprocating counterweight within the unit's vertical tower or derrick. Single chain lifting mechanisms are known, and such single chains generally have a short service life, have poor lifting stability, and require extensive maintenance and inspections. Such deficiencies adversely effect the oil producing capacity and performance of the oil pumping rig.

Such adverse effects may be understood by recognizing that in a belt-type or long stroke oil well pumping unit or rig of the type referenced above in Lively '959, a proximal or forward end of a cantilevering and rotating axle bears the weight of the rig's heavy vertically reciprocating counterweight. Such weight bearing axle end is commonly received within a rotary bearing which is mounted within an axle bore within a body or block of a roller trolley.

The roller trolley component of such known long stroke rigs is commonly mounted on wheels or rollers within a laterally oblongated track frame, such frame typically being secured to the lower end or undersurface of the counterweight. The axle's rearward cantilevering extension is known to undesirably work as a lever arm against the peripheral surface or circular edge at the rear opening of the roller trolley's sleeve bearing. Such levering action is normal to or out-of-axis with respect to the axle's longitudinal axis of rotation, resulting in premature wear degradation of the bearings.

In the Lively '959 type long stroke rig, the extreme rearward or distal end of the trolley axle is commonly fixedly attached to a vertically cycling continuous loop chain which is driven and guided by a lower drive sprocket and an upper idler or driven sprocket. A "knuckle" adapter or connector is commonly utilized to join the distal end of the axle with such continuous loop chain, such adapter typically being configured in the form of a "C" bracket or "C" channel member whose channel opens toward the sprockets. The knuckle's "C" bracket integrally incorporates and functions as a loop completing link of the chain. Pins spanning longitudinally between the "C" bracket's flanges capture conventional links of the chain, effectively integrating the "C" bracket as a link of the chain.

Such knuckle attachment adapter cycles with the continuous loop chain, continuously upwardly and downwardly carrying the cantilevering axle, and correspondingly upwardly and downwardly carrying the weight of roller trolley and counterweight components which are rotatably supported at the forward end of the axle. As the cycling knuckle reaches the upper end of the known assembly's single upper idler sprocket, the knuckle's pins commonly rest upon the floors of valleys defined by circumferentially adjacent sprocket teeth. Points of contact between the pins and the floors of such valleys are commonly small, and entire weight of the counterweight may be borne at such small pin/valley contact points. Such weight bearing contact effectively converts the trolley axle into a torque imposing lever arm having a length equal to the distance between the axle's trolley mounted rotary bearings and such rearward sprocket contact point. Such levering effect produces off axis wear patterns within the trolley's main rotary bearings. Such axle imposed levering torque also undesirably drives the trolley's upper rollers forwardly against the rearward sides or faces of the track frame's upper tracks. Correspondingly, the trolley's lower rollers are drawn rearwardly against the frame's lower tracks. Such torsion induced forces tend to cause excessive and premature wear of the trolley.

The instant inventive assembly advantageously balances torsion forces within such long stroke oil pumping rig's roller trolley, thereby solving or ameliorating the wear accelerating effects produced by such torsion forces. Such benefits are achieved by associating with the known single chain drive a counter-torque producing lever arm whose rearward or distal end is mounted to a secondary and relatively rearwardly positioned or duplex extended continuous loop chain drive assembly.

SUMMARY OF THE INVENTION

A suitable embodiment of the present invention provides a lifting mechanism for a belt-type pumping unit to solve the above described problems in the prior art which diminish the production capacity of the pump rig and which require extensive maintenance and inspection. The short service life and poor stability of the single chain lifting mechanism which is known to be incorporated in long stroke oil pumping rigs are addressed and ameliorated by the instant inventive assembly.

To achieve these objectives, a suitable embodiment of the instant invention incorporates paired frontward and rearward driving sprockets, paired frontward and rearward driven or idler sprockets, paired frontward and rearward continuous loop chains installed over said sprockets, and a specialized dual "C" channel bracket knuckle which effectively mounts a longitudinally extending lift axle to said chains. The continuous loop chain components of the instant invention may comprise longitudinally separate front and rear chains which are respectively driven and guided by a front idler and driving sprocket and longitudinally separated rear idler sprocket and driving sprocket. In an alternative suitable embodiment, the front and rear chain components are closely longitudinally spaced or are longitudinally interconnected, such chains taking the form of a duplex chain whose front and rear plates are linked in common by longitudinally lengthened axle pins. Where the duplex chain configuration is adopted, the idler and driven sprockets may be configured as unitary wheels or duplex chain sprockets which present front and rear circumferential arrays of chain engaging teeth.

The inventive assembly further incorporates stroke adjusting mechanisms for vertically adjustably supporting the driven sprockets and for variably tensioning the chains. The assembly's driving sprockets and the driven sprockets are provided with circumferential arrays of teeth to match the spacing of cross pins within the frontward and rearward chains, each chain preferably including a plurality of interconnected quick-to-dissemble sections. In a suitable embodiment, the stroke adjusting mechanism includes a fixed support and a lifting support which are connected to each other by a vertical position adjusting hydraulic cylinder, and which includes a chain tension adjusting jack screw mechanism.

In the suitable embodiment, the jack screw actuated tensioning mechanism is mounted on the lifting support, and a driven sprocket axle is mounted on the stroke adjusting bracket by the tensioning mechanism. The driven sprockets are mounted for rotation with or with respect to such axle support.

The tensioning mechanism suitably includes a base mounted on the lifting support and an axle seat in running fit with the driven sprocket axle. A plurality of uniformly distributed helically threaded apertures may be formed in the axle seat, and mating support adjusting bolts may be mounted in threaded connection within such apertures. Base and the support adjusting members of the tensioning mechanism are vertically adjustably connected by the support adjusting bolts.

A specialized knuckle component of the instant inventive assembly suitably serves as a transitional chain link member or members of the assembly's longitudinally paired continuous loop chains or duplex chain. Such knuckle suitably includes a triple of or three flanges which form a longitudinally adjacent pair of "C" brackets. A rearward flange of a forwardmost bracket among such pair of brackets and a forward flange of a rearwardmost bracket among such pair of brackets suitably comprise the flange triple's middle flange. The webs of such pair of "C' brackets are suitably wholly formed or are continuous with each other, the web of the rearmost "C" bracket additionally functioning, as further explained below, as a counter-torque imposing lever arm.

In the suitable embodiment, the longitudinal dimensions of the "C" bracket configured channels' slots match the longitudinal dimensions of the chains or longitudinal halves of a provided duplex chain. A pair of chain axle or pin receiving apertures is suitably formed in each of the knuckle's flange plates. Lengthening of the longitudinal dimension of the specialized knuckle may beneficially lengthen the knuckle's effective lever arm component, such lengthening being facilitated by provisions of longitudinally separate "C" brackets, sprockets and chains. Shortening of the knuckle's length advantageously allows the above described middle flange to function as a "C" bracket completing flange of both "C" brackets, and allows the front and rear chains to be correspondingly configured as a duplex chain.

The above described embodiment of the present invention has the following advantages:

The longitudinally paired continuous loop chains (either a single duplex or a longitudinally separated pair of chains) operatively reduce twisting out-of-axis deflections with respect to the rotation axes of the sprockets.

The specialized knuckle and chain assembly helps to increase the load bearing capacity of the assembly, prolonging the service life of the chains. Such assembly also improves the operating stability of the lifting mechanism.

The longitudinally paired chains, along with the chain interconnecting specialized knuckle, beneficially reduce excessive abrasion of the teeth of the sprockets arising as a result of deflection and twisting of the chains. The chains and knuckle effectively prolong the service life of the sprockets while reducing frequency of maintenance and parts replacement.

The longitudinally paired chains may be beneficially provided with quick-to-dissemble sections or links which enable quick assembly and disassembly. The invention's specialized quick-to-disassemble links are especially beneficial and useful during mountings and dismountings the chains, which are necessarily performed during adjustments of the vertical stroke of the belt-type pumping unit. The invention's specialized links further facilitate easy adjustments to the cycling lengths of the chains. The instant invention's provision of such specialized links allows easy and efficient adjustments of the stroke of the belt-type pumping unit, greatly improving the unit's production capacity.

Further advantages of the instant invention relate to lessening of out-of-axis torsion or twisting forces applied to a trolley axle component of the assembly. Such axle has a forward or proximal end, and has a rearwardly cantilevering distal end. In the suitable embodiment, the forward end of the axle is rotatably mounted upon a counterweight carrying roller trolley component of the belt-type long stroke pumping rig. In such embodiment, the roller trolley may include a central block or base through which an axle bore extends, such extension being in the longitudinal direction or in a rear to front direction. Such axle bore is suitably lined by rotary bearings, the forward extension of the axle being nestingly and rotatably received by such bearings.

A further structural component of the embodiment comprises the above described knuckle configured transitional chain link which may be more particularly described as including a front or forward "C" channel bracket or member whose forward flange is fixedly attached to or formed wholly with the rearward or distal end of the axle component. Such forward "C" bracket or "C" channel member further presents a rearward flange, and includes a web which spans longitudinally between the forward and rearward flanges' bases.

Further structural components of the embodiment may comprise the above described forward chain, forward drive sprocket and forward driven sprocket, such components being alternatively described together as a forward chain drive assembly. In the embodiment, the forward "C" bracket component of the knuckle is integrated into the forward chain drive assembly by the above described cross pins, such pins incorporating the forward "C" bracket as an integral chain link. Such incorporation operatively attaches the forward "C" bracket and the axle to the forward chain.

A further structural component of the embodiment comprises a lever arm whose base or proximal end is fixedly attached to or formed wholly with the knuckle's forward "C" bracket component. The lever arm component suitably extends rearwardly from the forward "C" bracket, and such member suitably comprises a web component of a second or rearward "C" bracket component of the knuckle.

A further structural component of the embodiment may suitably comprise a second or rearward chain drive assembly which incorporates the above described rearward drive sprocket, rearward driven sprocket and rearward continuous loop chain. The continuously looping and cycling chain of such rearward chain drive assembly is suitably engaged by or integrally incorporates the knuckle's rearward "C" bracket component. Where a continuous loop duplex chain is provided, the rearward aspect or extension of such chain comprises such rearward continuous loop chain.

The forward and rearward chain drive assemblies preferably incorporate a pair of upper idler sprockets (i.e., the above described front and rear driven sprockets, or unitary duplex chain sprocket) whose teeth respectively engage the forward and rearward continuous loop chains, the teeth of such sprockets cyclically engaging cross pins or axles which extend longitudinally through the front and rear "C" members' flanges.

While the knuckle passes over the upper ends of the front and rear driven sprockets, weight and downward pressure exerted by the roller trolley and by the drilling rig's counterweight against the axle tends to downwardly depress the forward end of the axle. Such downward force tends to simultaneously downwardly pivot the axle about the juncture between the knuckle's forward "C" bracket and the forward driven sprocket. In opposition to such pivoting effect, downwardly directed chain tension exerted by the rearward continuous loop chain (or by the rearward end of the suitably alternatively utilized duplex chain) pulls the knuckle's rearward "C" bracket downward against the upper rearward driven sprocket. Such pulling force supplies a beneficial counter-torque moment along the web of the rearward "C" bracket, such web functioning as a lever arm which cancels the opposite torque generated by the weight of the counterweight against the front end of the axle. The counter-torque supplied by the instant invention's lever arm component advantageously cancels and corrects out-of-axis torque moments experienced by the axle within the axle supporting rotary bearings within the roller trolley, beneficially reducing bearing wear. Off track skewing of the trolley's rollers within the track frame is also beneficially reduced.

Accordingly, objects of the instant inventive include the provision of an assembly which incorporates structures, as described above, and which arranges those structures in manners described above, for the performance of and achievement of beneficial functions, as described above.

Other and further objects, benefits, and advantages of the instant invention will become known to those skilled in the art upon review of the Detailed Description which follows, and upon review of the appended drawings.

BRIEF DESCRIPTION OF THE DRAWINGS

To explain the various embodiments of the present invention along with the technical solutions the invention provides over the prior art, drawings of exemplary embodiments of the invention and of the prior art are submitted herewith. The accompanying drawings and the following description are merely exemplary, and those of ordinary skill in the art may derive other structural configurations from the accompanying drawings and description without creative effort.

DETAILED DESCRIPTION

Implementation modes of the instant invention will be described by the following specific embodiments. Those skilled in the art can easily understand other advantages and effects of the present invention from the content disclosed in this description. The described embodiments are part rather than all of the embodiments of the present invention. All other embodiments made by those of ordinary skill in the art based on the herein disclosed embodiments of the present invention without creative work fall within the scope of protection of the present invention.

Figure 1:
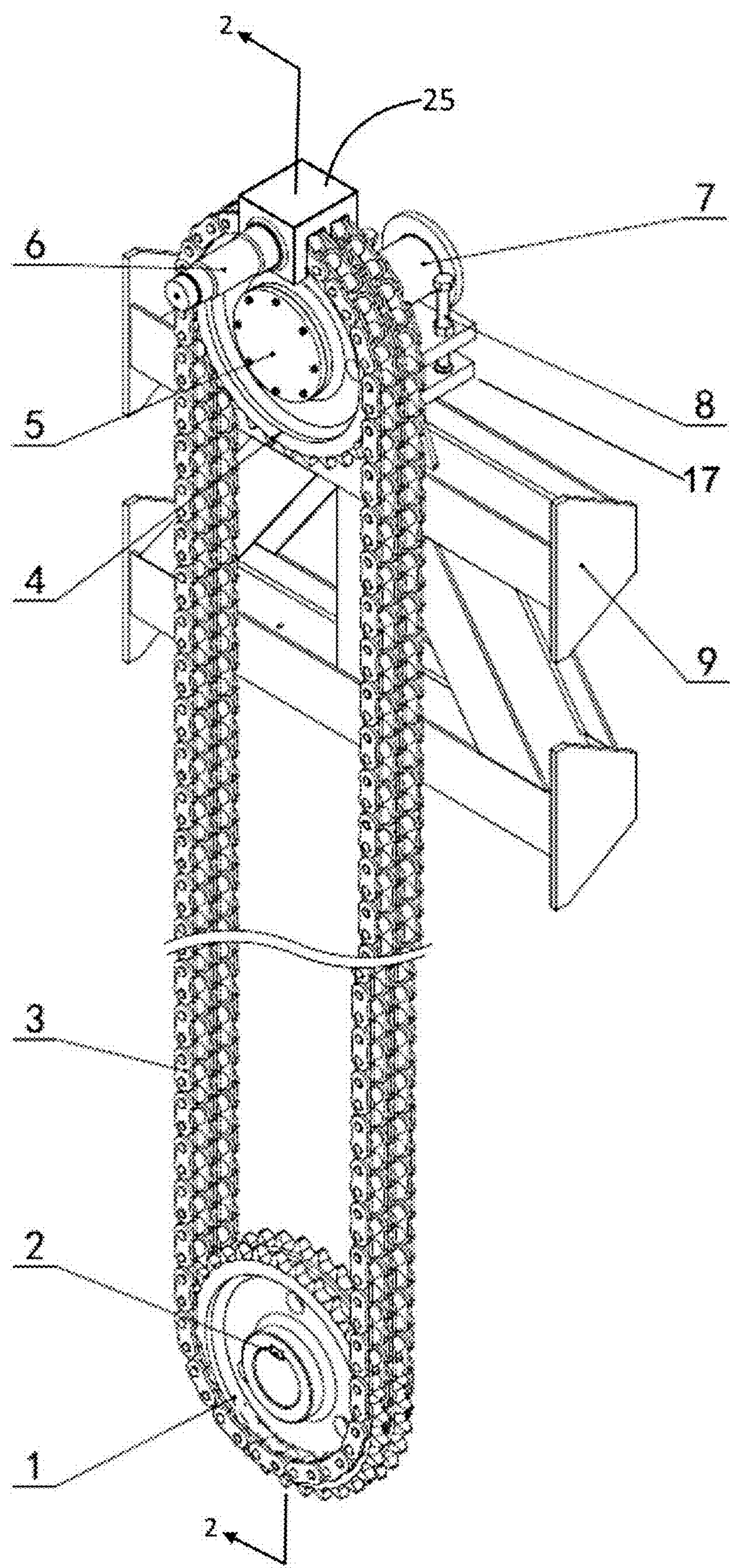
FIG. 1 is a perspective view of chain (duplex chain alternative), sprocket, knuckle, axle, and vertical adjustment mechanism components of the instant invention.
Figure 2:
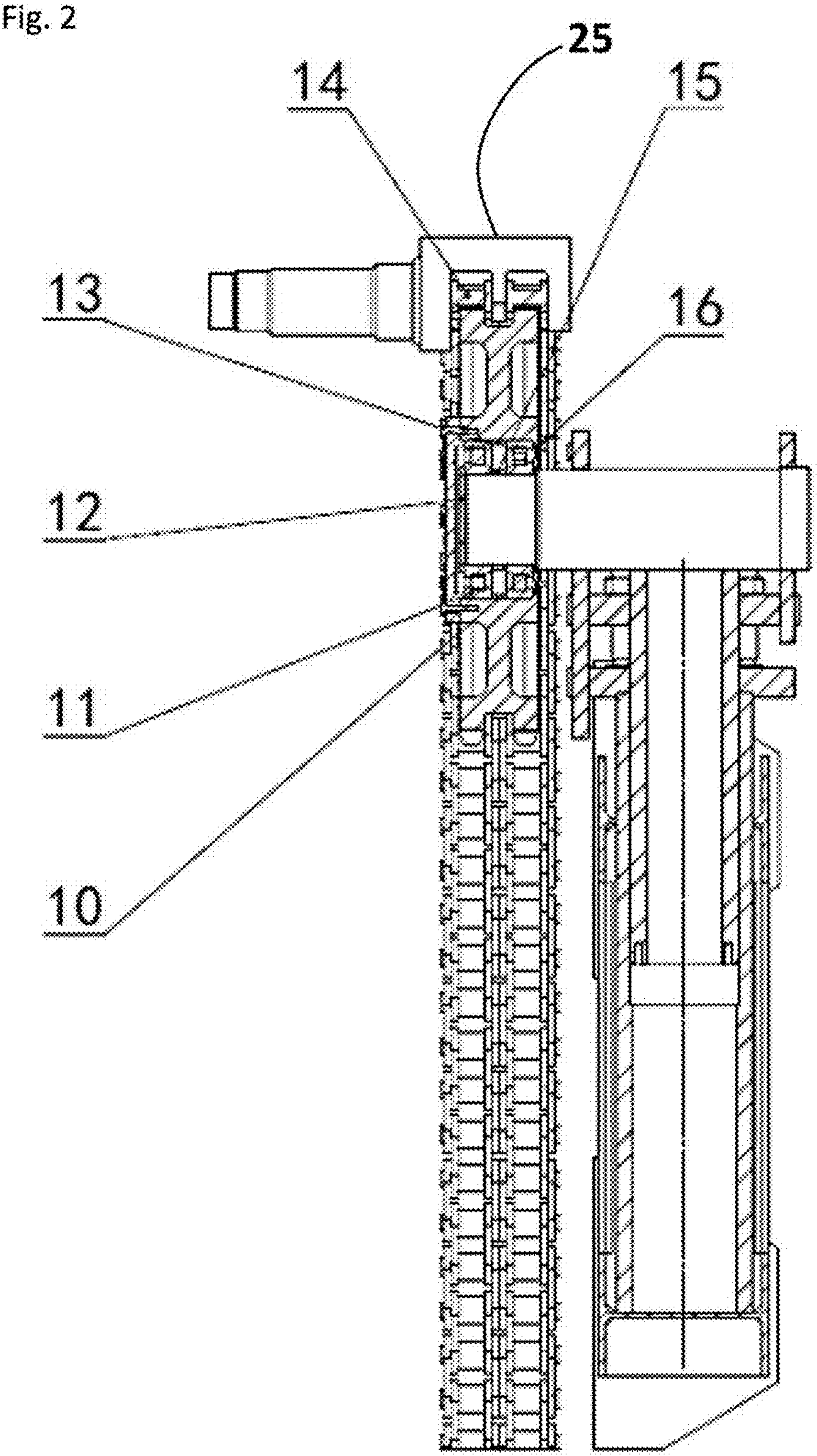
FIG. 2 is a partial sectional view as indicated in FIG. 1.

As shown in the embodiment of FIGS. 1-6, the instant invention comprises a lifting mechanism for a belt-type pumping unit or long stroke wellhead oil pumping rig, such unit including a longitudinally paired or front and rear driving sprockets 1, longitudinally paired or unitary front and rear driven or idler sprockets 4, a stroke adjusting bracket 9 for supporting the driven sprockets 4, and longitudinally paired or duplex continuous loop chains 3, said chains being connected operatively to the driving sprockets 1 and the driven sprockets 4. The driving sprockets 1 and the driven sprockets 4 are respectively provided with circumferential arrays of teeth to match the paired chains or duplex chain 3. The driving and driven sprockets may, as indicated in FIG. 2, comprise front and rear circumferential arrays of teeth extending radially outwardly from a unitary wheel or disk. Alternatively as indicated in the FIGS. 9 and 10, longitudinally separated front and rear sprocket members, such as sprockets 600A and 6000, may be utilized. Where the front and rear sprockets are unified as indicated in FIG. 2, the front and rear chains 3 abut each other or are closely longitudinally spaced, such close spacing of chains allowing the front and rear continuous loop chain components to be configured as a single duplex chain whose longitudinally extending cross pins commonly span and interconnect the chains.

Figure 3:
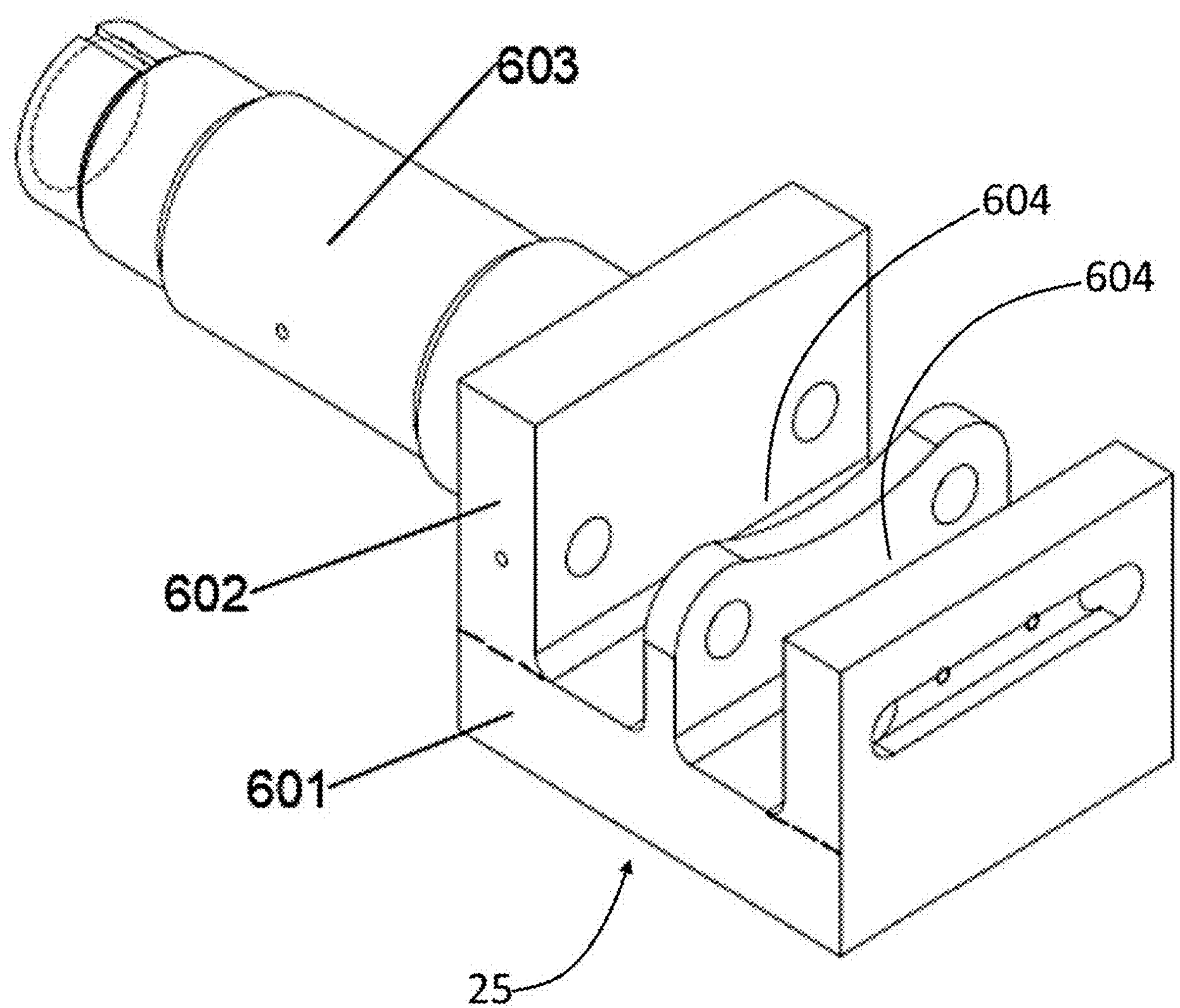
FIG. 3 is a perspective view of chain integrating knuckle and trolley axle components.
Figure 5:
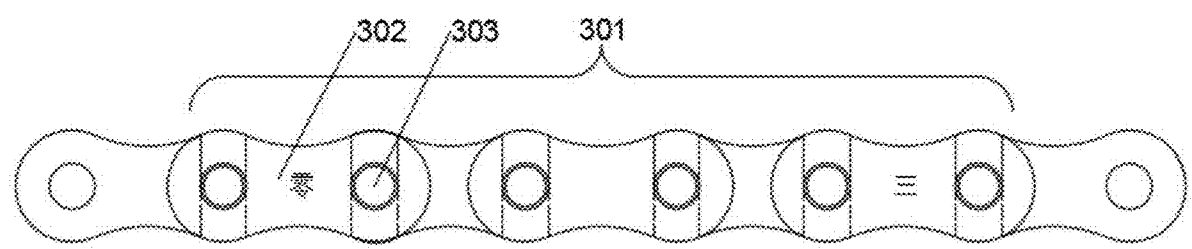
FIG. 5 is a schematic structural diagram of a quick-to-disassemble section of a section of the chain of FIG. 1.
Figure 6:
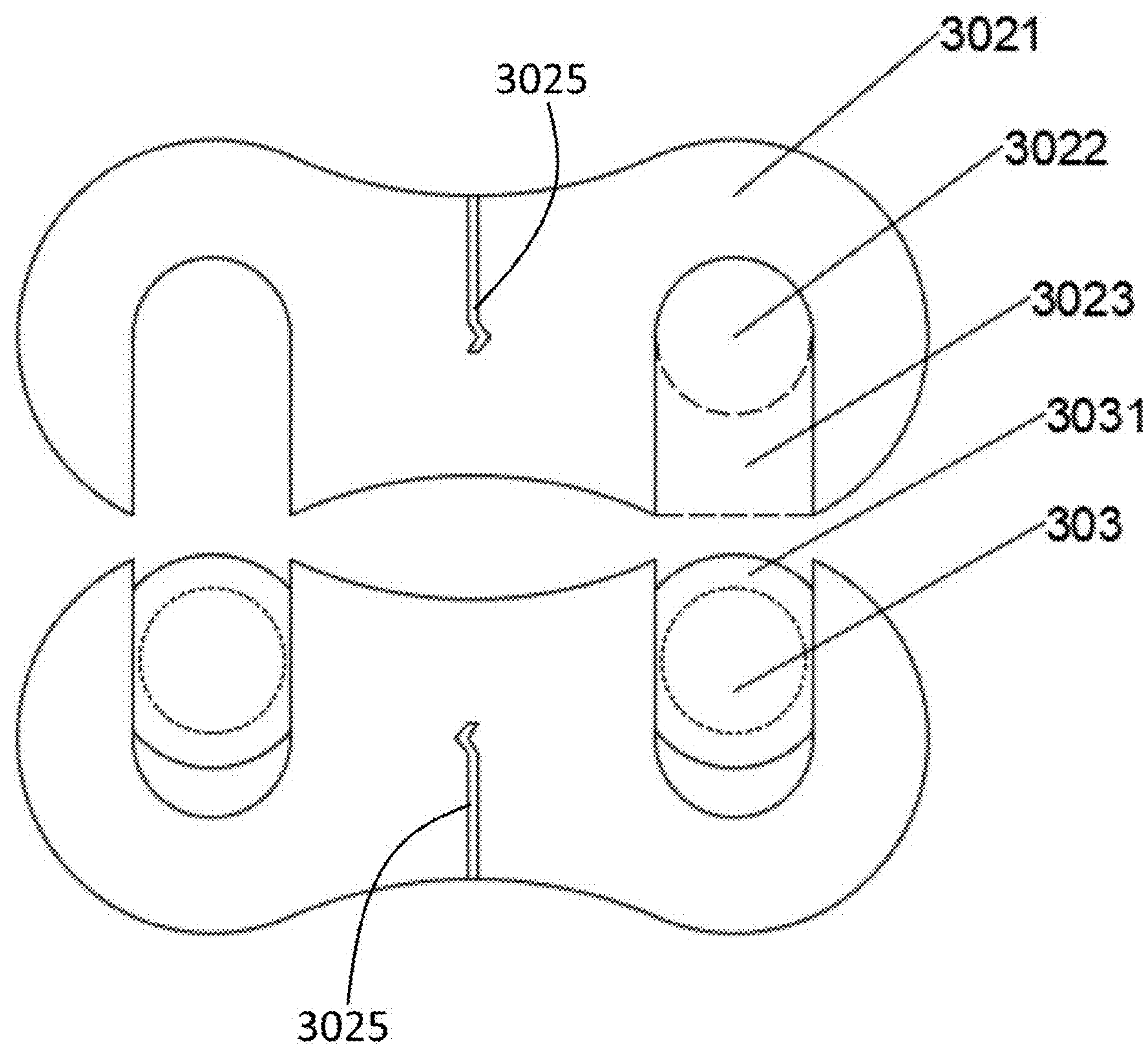
FIG. 6 is a schematic structural diagram of quick-to-disassemble chain plate components of the FIG. 5 chain segment.

Referring in particular to FIGS. 3, 5, and 6, the chains 3 (either longitudinally separated or duplex configured) are connected by a transitional chain link or "C" channel knuckle component 25, such chain including a plurality of interconnected quick-to-assemble sections 301.

The driving sprockets 1 are fixedly connected to a rotary drive axle of a diesel engine or a gasoline engine by a driving sprocket key or keys 2 which translate the engine's rotary power to the driving sprockets. The chain's engagements with the driving sprockets' teeth allow their powered rotation to induce cyclic motions of the chains upwardly toward and downwardly from the driven sprockets 4. The knuckle 25 travels cyclically with the chains 3, such knuckle being fixedly attached to or formed wholly with a forwardly extending axle 603. Each of the chains 3 generally includes a multiplicity of chain links, chain plates, and chain axles or cross pins. As shown in FIG. 2, the knuckle 25 functions as a transitional chain link which is secured to the front and rear chains 3 by knuckle spanning axles or pins 14.

Lifting assemblies incorporated within belt-type pumping units are known to utilize a sprockets and chain combination or assembly which incorporates a single continuous loop chain. To overcome performance deficiencies of such known assemblies, the present invention adapts the lifting mechanism to include the longitudinally paired chains 3 (either separate or duplex configured) and to include their matching longitudinally paired drive and driven sprockets. Compared with a prior art long stroke pumping unit which incorporates a single chain assembly, the instant invention's paired chains and sprockets have the following advantages:

The longitudinally paired chains 3 are high in structural strength, thereby increasing load capacities and prolonging the service life of the chains.

During operation, the chain of the prior art lifting mechanism is subject to twisting forces relative to the longitudinal axis. The instant invention's provision of paired or duplex chains 3 increases the tolerance of the chains to such forces, greatly reducing the out-of-axis deflections of the chain knuckle 25. Accordingly, the instant invention enhances operating stability of the lifting mechanism. The assembly's resistance of out-of-axis knuckle deflection advantageously reduces abrasion of the teeth of the sprockets, increasing the service life of the sprockets, and decreasing the frequency of performance of maintenance upon the belt-type pumping unit.

When the length of the stroke of the instant inventive belt-type pumping unit must be adjusted, the stroke adjusting bracket 9 advantageously facilitates relative vertical repositioning of the sprockets, adjusting the distance between the driven sprockets 4 and the driving sprockets 1. Such readjustment typically requires that the chains 3 be dismounted in order to adaptively adjusted in chains' lengths for proper tensioned remounts about the paired upper and lower driven and drive sprockets 4 and 1. During such chain mounting operations, the belt-type pumping unit is necessarily deactivated.

In known long stroke oil pumping rigs, the task of dismounting and mounting the chain is mechanically complex and time consuming, and the instant invention's provision of an additional rearward chain and sprockets assembly may aggravate such difficulties. Incorporation of known configurations of continuous loop chains or a known configuration of a continuous loop duplex chain into the instant inventive assembly may undesirably result in further complication and delay of the chain mounting and dismounting procedure, such delay potentially allowing outside air to aspirate into the pumping pipeline under the action of gravity while the belt-type pumping unit is deactivated.

To ameliorate such difficulties and delays in mounting and dismounting the chains 3 during performance of stroke adjustment procedures, the chains 3 are designed to include within the general body of the chain a plurality of quick-to-disassemble sections 301. The chain's quick-to-disassemble sections 301 are incorporated within the general chain so that opposite ends of each quick-to-disassemble section 301 are connected either to an adjacent quick-to-disassemble section 301 or to chain links at ends of the general chain. Such connections are facilitated by quick-to-disassemble chain plates 302 and by quick-to-disassemble chain axles or pins 303.

The quick-to-disassemble chain plates 302 may be marked (as shown in FIG. 5) with indicia of the lengths of the plurality of quick-to-disassemble sections 301, such indicia assisting a technician by allowing a quick determination of a number of chain links which must be added or subtracted to facilitate a desired stroke length adjustment. The plurality of quick-to-disassemble sections 301 may have the same or different lengths, which may be set correspondingly according to actual use demands.

The incorporation within the chains 3 of the quick-to-disassemble sections 301 advantageously facilitates easy and convenient mounting and dismounting of the chains during the stroke adjustment of the belt-type pumping unit. The process of adjustment of the lengths of the chains 3 is further optimized by the quick-to-disassemble sections 301 allowing the chains 3 to be easily closely fitted and properly tensioned within the belt-type pumping unit. Working efficiency achieved during adjustments of the stroke of the belt-type pumping unit is greatly improved by the specialized links 301, the maintenance frequency of the belt-type pumping unit being thereby reduced. Accordingly, the overall production capacity of the pumping rig is improved and the service life thereof is prolonged.

Referring to FIGS. 5 and 6, the quick-to-disassemble chain plates 302 suitably incorporate matching ring slots 3031, such slots being formed at end portions of the quick-to-disassemble chain axles 303. The quick-to-disassemble chain plates 302 further include pairs of plate bodies 3021 having chain axle apertures 3022 which are formed at opposite ends of the paired plate bodies 3021. Slots 3023 communicate with chain axle apertures 3022 which are formed in the plate body 3021. The quick-to-disassemble chain axles 303 may be inserted into the chain axle apertures in a sliding manner.

A ring slot 3031 is formed in each of the two ends of the quick-to-disassemble chain axles 303, the slots 3023 being as wide as the portions of the quick-to-disassemble chain axles 303 which include the ring slots 3031. After the slots 3023 are aligned with the ring slots 3031, the plate bodies 3021 may be slidably moved in opposite directions from sides of the chain link until the chain axle holes 3022 on the two plate bodies 3021 align with each other. Such alignment of apertures allows the peripheries of the chain axle holes 3022 of the plate bodies 3021 to be clamped into the ring slots 3031 of the quick-to-disassemble chain axle 303, the plate bodies 3021 thereby being secured to the quick-to-disassemble chain axles 303.

Four quick-to-disassemble chain plates 302 may suitably be provided to adapt the duplex configured chain 3 for ease of sprocket mounts and dismounts. The sides of the four plate bodies 3021 are suitably positioned away from one another on two sides of the quick-to-disassemble chain axle 303, and such bodies may be connected by a connecting part in order to facilitate quick mounting and dismounting of the quick-to-disassemble chain plates 302. Flexible linking arms or barbs 3025 may be attached to opposing ends of the connecting part, such barbs operatively establishing a latched plate interconnection which prevents the two plate bodies 3021 of a single quick-to-disassemble chain plate 302 from separating during use.

Figure 4:
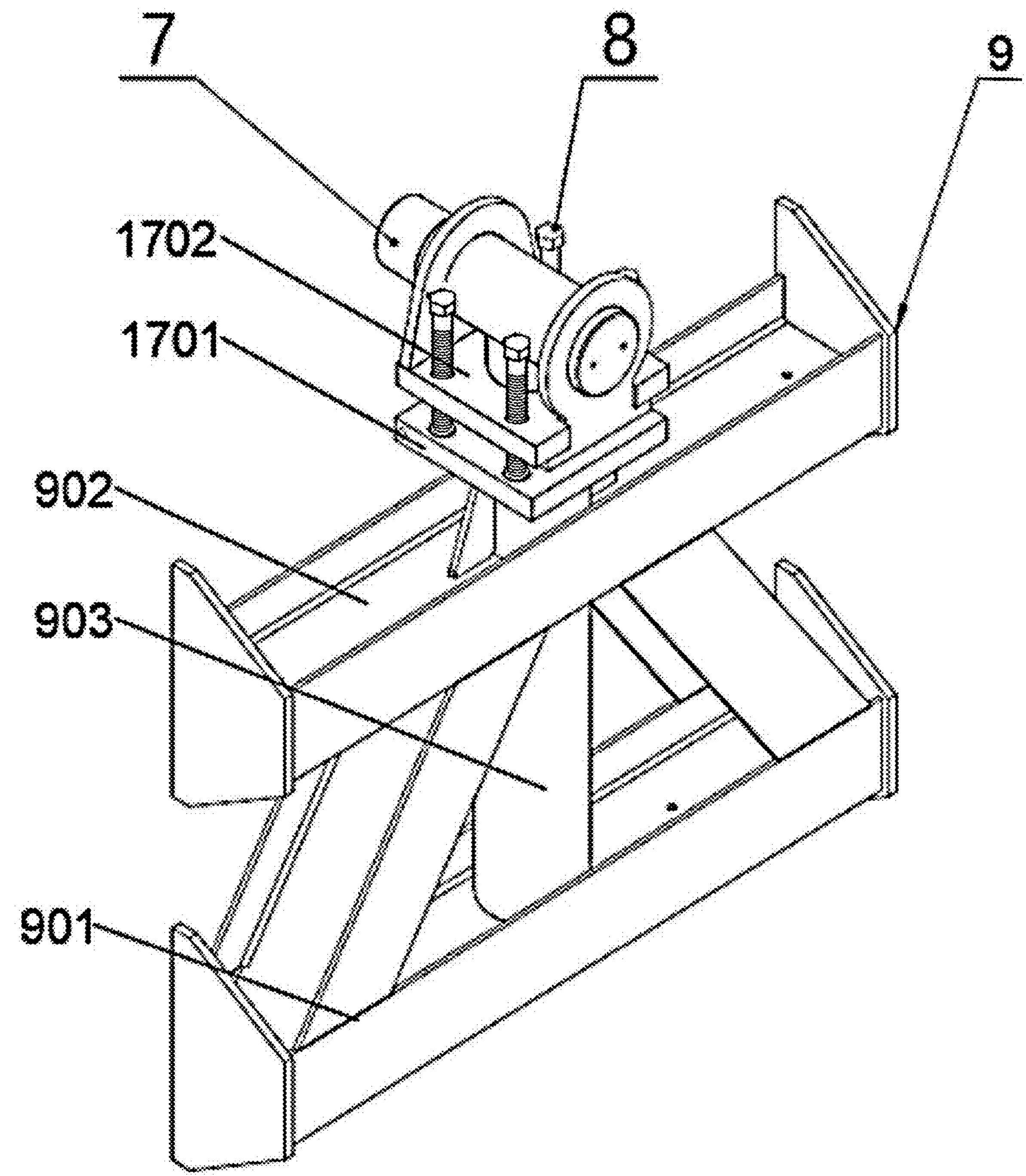
FIG. 4 is an alternative perspective view of the vertical adjustment mechanism of FIG. 1.

Referring to FIGS. 1, 2, and 4, the vertically moveable and adjustable stroke adjusting bracket 9 includes a fixed support member 901 and an overlying vertically moveable sprocket axle lifting support 902, such supports 901 and 902 being vertically interconnected by a hydraulic cylinder 903. The fixed support 901 may be secured to rigid frame members of the pumping rig's vertical tower, and the lifting support 902 may be selectively driven upwardly or downwardly by operation of the hydraulic cylinder 903. Such hydraulic cylinder operation adjusts the distance between the driving sprockets 1 and the driven sprockets 4 in order to adaptively adjust and guarantee a close fitting of the chains 3 to the upper and lower sprockets. Thus, the stroke of the belt-type pumping unit may be easily and conveniently adjusted.

The transitional chain link or knuckle 25 includes a longitudinally extending base plate or "C" channel web member 601. A longitudinally forward "C" channel flange or wall member 602 is fixedly attached to or formed wholly with the forward end of the base plate 601, and an axle shaft 603 is fixedly attached to and extends forwardly from a forward face or end of such flange 602. The axle shaft 603 is connected to the belt of the belt-type pumping unit in the manner further described below.

The transitional chain link or knuckle 25 is secured to the chains 3 by chain axles or cross pins 14. Chain slots or "C" channel openings 604 dimensionally match the longitudinal dimensions or widths of the chains 3, such openings being formed between the "C" channel brackets' flanges or walls. The chains 3 may be longitudinally spaced or separated within the "C" channel openings 604, such separation suitably longitudinally separating the chains 3. Alternatively, as drawn in FIGS. 1 and 2, the chains 3 may be configured as a unitary duplex chain with the knuckle's medial flange serving as duplex chain medial plates.

Referring to FIGS. 1 and 4, a tensioning mechanism 17 may be mounted on the lifting support 902, and a driven sprocket axle 7 may be mounted on the stroke adjusting bracket 9 by such tensioning mechanism. The driven sprockets 4 are rotatably mounted on the driven sprocket axle 7, the height of the driven sprockets and the driven sprocket axle 7 being advantageously vertically adjusted by operation of the tensioning mechanism 17. Screw actuated operation of the tensioning mechanism 17 allows the distance between the driven sprockets 4 and the driving sprockets 1 to be precisely adjusted to guarantee appropriate tensioning of the chains 3.

The tensioning mechanism 17 includes a base 1701 which is mounted on the lifting support 902, and includes an overlying axle seat 1702 in running fit with the driven sprocket axle 7. A plurality of uniformly distributed internally helically threaded apertures is formed in the axle seat 1702, and helically threaded support adjusting bolts 8 are mounted in threaded connection with such apertures. The lower ends of the support adjusting bolts 8 are rotatably mounted on the base 1701, allowing the axle seat 1702 to be moved vertically relative to the base 1701 by rotating such bolts. Accordingly, the instant invention facilitates jack screw adjustment of the height of the driven sprockets 4.

Referring to FIG. 2, the driven sprockets 4 may be advantageously mounted upon the driven sprocket axle 7 by a cylindrical roller bearing 11. A bearing seal cover 16 and a bearing inner ring gland 12 are mounted at one end of the cylindrical roller bearing 7 and configured to seal lubricating grease. Small sprocket spacers 15 and 10, and a relatively large sprocket spacer 13 are sequentially mounted on an inner ring of the driven sprockets 4 in an axial direction and are configured to secure the driven sprockets 4 in an axial direction and to reduce abrasion to the inner ring of the driven sprocket 4.

Figure 7:
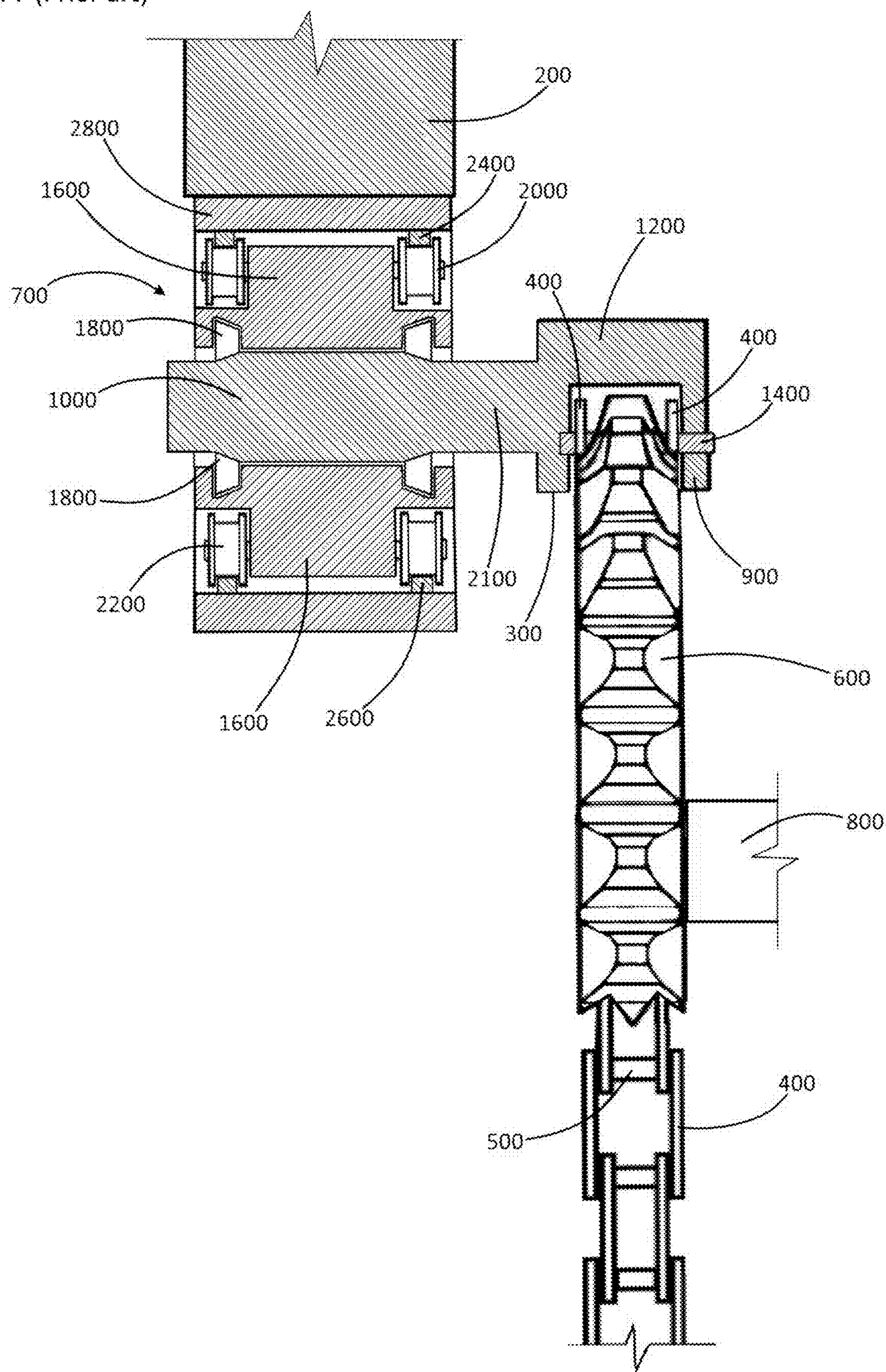
FIG. 7 is a sectional view of a prior art roller trolley and chain drive linkage assembly of the type known to be incorporated within long-stroke oil pumping rigs.
Figure 9:
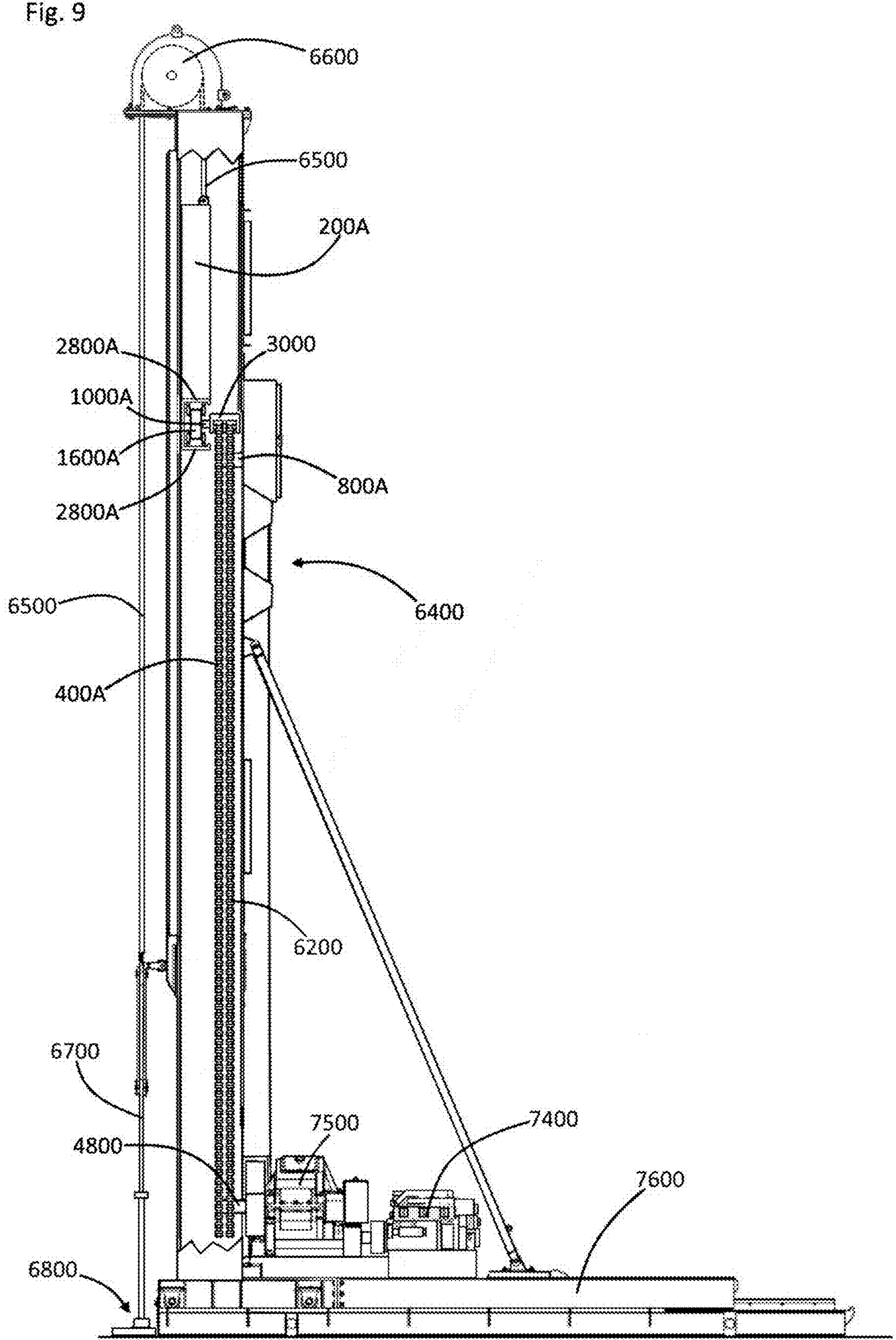
FIG. 9 is a side view of a long stroke oil well pumping rig which incorporates an alternative separated dual chain embodiment of the instant inventive assembly, the view including a cutaway section within a tower casing wall, such cutaway exposing interior structures.

Referring to Drawing FIG. 7, a prior art chain drive and roller carriage assembly is depicted, such assembly being known to be incorporated within a long stroke oil well pumping unit or rig of the type described in the Lively '959 prior art reference. Hereinabove, such long stroke oil well pumping units or rigs have been denominated as belt-type pumping units or rigs. Such prior art pumping rigs are known to incorporate a single upper idler or driven sprocket 600 which is rotatably mounted upon an upper axle 800, such axle commonly being supported upon frame members of such pumping rig's vertical tower or derrick. Tower 6400 of the long stroke pumping rig depicted in FIG. 9 provides an example of such tower or derrick.

In the prior art configuration, a single continuous loop chain 400 spans over the idler sprocket 600, such chain 400 having a multiplicity of sprocket tooth engaging cross pins or axles 500. The chain 400 is cyclically driven by an underlying or lower drive sprocket (e.g., FIG. 1's lower driven sprocket 1). A heavy overlying counterweight 200 reciprocatingly moves upwardly and downwardly along vertical roller tracks (not depicted within views) which are mounted within the casing of the pumping unit's vertical tower. As shown in FIG. 9, a roller pulley 6600 is mounted at the upper end of the tower 6400, and a high tension flexible belt 6500 extends over such pulley. The rearward end of the belt 6500 is fixedly attached to the counterweight 200A, and the forward end of the belt 6500 is attached to a polish rod 6700 extending from a wellhead 6800. Powered vertical reciprocating motion of the counterweight 200 is translated to the polish rod 6700 via the roller pulley 6600 and the belt 6500. The counterweight 200 is mechanically linked to the continuous loop chain 400 by an axle 1000 which has a chain attachment adapter or knuckle 1200 fixedly attached to or formed wholly with its distal rearward end.

Such knuckle 1200 is commonly configured as a "C" bracket which mounts to, receives, or integrally incorporates the continuous loop chain 400. Pins or axles 1400, which longitudinally span the "C" bracket, anchor their ends within the "C" bracket's front and rear wall flanges 300 and 900, such pins functioning similarly with the chain's multiplicity of link connecting pins or axles 500. The knuckle spanning pins 1400 allow the knuckle 1200 to constitute and function as an integral link of the continuous loop chain 400, the knuckle portion of such chain engaging the teeth of the upper idler sprocket 600 similarly with successive engagements of the sprocket's teeth with the chain's multiple pins 500.

The axle 1000 is rigidly attached to or formed wholly with the knuckle 1200, such attachment forwardly and ideally horizontally extending the axle 1000. The axle's forward extension is commonly received within a longitudinal axle bore formed within a block or body 1600 of a roller trolley 700. Tapered roller bearing assemblies 1800 mounted within and lining such trolley body bore closely receive and rotatably support the axle 1000. As the knuckle 1200 and axle 1000 cyclically move with the chain 400, the axle 1000 rotates within the trolley body 1600. The roller bearings 1800 facilitate such rotation while securely mounting the axle to the body 1600.

Upper wheels or rollers 2000 are rotatably mounted at the upper end of roller trolley body 1600, and lower rollers 2200 are similarly rotatably mounted at the lower end of trolley 1600. Such rollers 2000 and 2200 respectively receive and rollably move in a reciprocating fashion laterally and oppositely laterally along laterally extending upper and lower roller tracks 2400 and 2600.

The roller tracks 2400 and 2600 are fixedly and rigidly mounted upon opposing upper and lower surfaces of a rectangular frame 2800, such frame being rigidly mounted to the lower end of the counterweight 200. The weight of the counterweight 200 is borne by the axle 1000, such weight downwardly translating to the axle via the frame 2800, the tracks 2400, the rollers 2000, the trolley body 1600, and the roller bearings 1800. The forward end of the axle 1000 is commonly unsupported, and its rearward end commonly cantilevers to form a knuckle mounting extension 2100. Within such weight transfer linkage of the FIG. 7 prior art assembly, the rearward extension 2100 of axle 1000 and the distally attached knuckle 1200 may operate with respect to the bearings 1800 as a lever arm which drives the rearward end of axle 1000 upwardly against the rearward roller bearings. Such levering torque may simultaneously downwardly drive the forward end of the axle 1000 against the frontward roller bearing. Such upward and downward driving forces constitute out-of-axis torsion forces which tend to prematurely wear and degrade the bearings 1800. Such out-of-axis torque also wears and degrades other moving parts of the trolley. Such weight induced levering action may be recognized as a cause of the above described premature pumping rig mechanism wear and tear.

Figure 10:
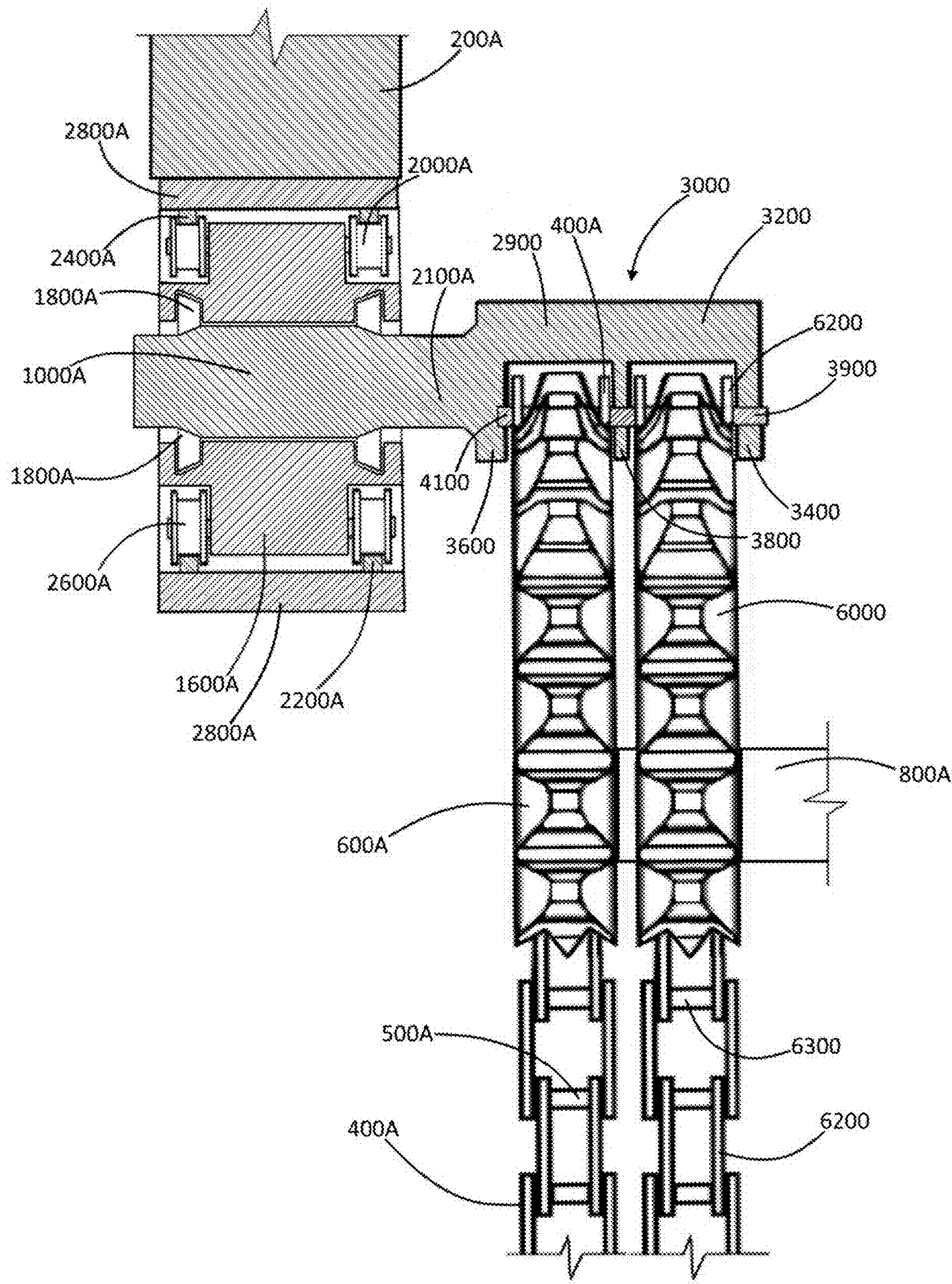
FIG. 10 redepicts the structure of FIG. 7, the view of FIG. 10 showing additional components of a separated chain alternative embodiment of the instant invention.

Referring simultaneously to FIGS. 7 and 10, each structure appearing in FIG. 10 which is identified by a reference numeral having the suffix "A" is configured substantially identically with similarly numbered structures appearing in FIG. 7. The FIG. 10 assembly re-presents the FIGS. 1 and 2 embodiment of the instant inventive assembly, such embodiment incorporating a knuckle which is identified in FIGS. 8-13 by Reference Numeral 3000. The knuckle 3000 is modified and adapted in relation to the FIG. 7 prior art knuckle 1200 to incorporate a rearwardly extending lever arm 3200, such arm 3200 dually and additionally functioning as a web component of a second or rearward "C" channel bracket component of knuckle 3000. Referring further simultaneously to FIG. 3, a similar rearwardly extending lever arm may be recognized as constituting or residing at the web portion of the FIG. 3 knuckle's rearward-most "C" channel 604.

The modified knuckle 3000 preferably incorporates such second or rearward "C" bracket which suitably comprises a forward flange 3800, and a rearward flange 3400. The web 3200 which spans longitudinally between the bases of flanges 3400 and 3800 suitably comprises and functions as the instant invention's rearwardly extending lever arm component 3200. Provided that the knuckle's rearward-most "C" bracket resides at the lever arm's rearward or distal end, the longitudinal length of the lever arm 3200 may suitably alternatively exceed that of the web's longitudinal span.

The knuckle's forward "C" bracket suitably incorporates a forward web member 2900, a forward flange 3600, and a rearward flange which suitably comprises the rear "C" bracket's forward flange 3800. Where the length of the lever arm 3200 exceeds the longitudinal span of the rear "C" bracket's web, the forward "C" bracket's rearward flange suitably alternatively constitutes a separate flange extension (not depicted in views). Upon such lever arm lengthening, the longitudinal displacement of sprockets 600A and 6000 from each other along axle 800A is correspondingly increased. Suitably, the sprockets 600A and 6000 may be alternatively configured as a unitary disk or wheel sprocket similar to FIG. 1's duplex chain guiding sprocket 4.

Figure 8:
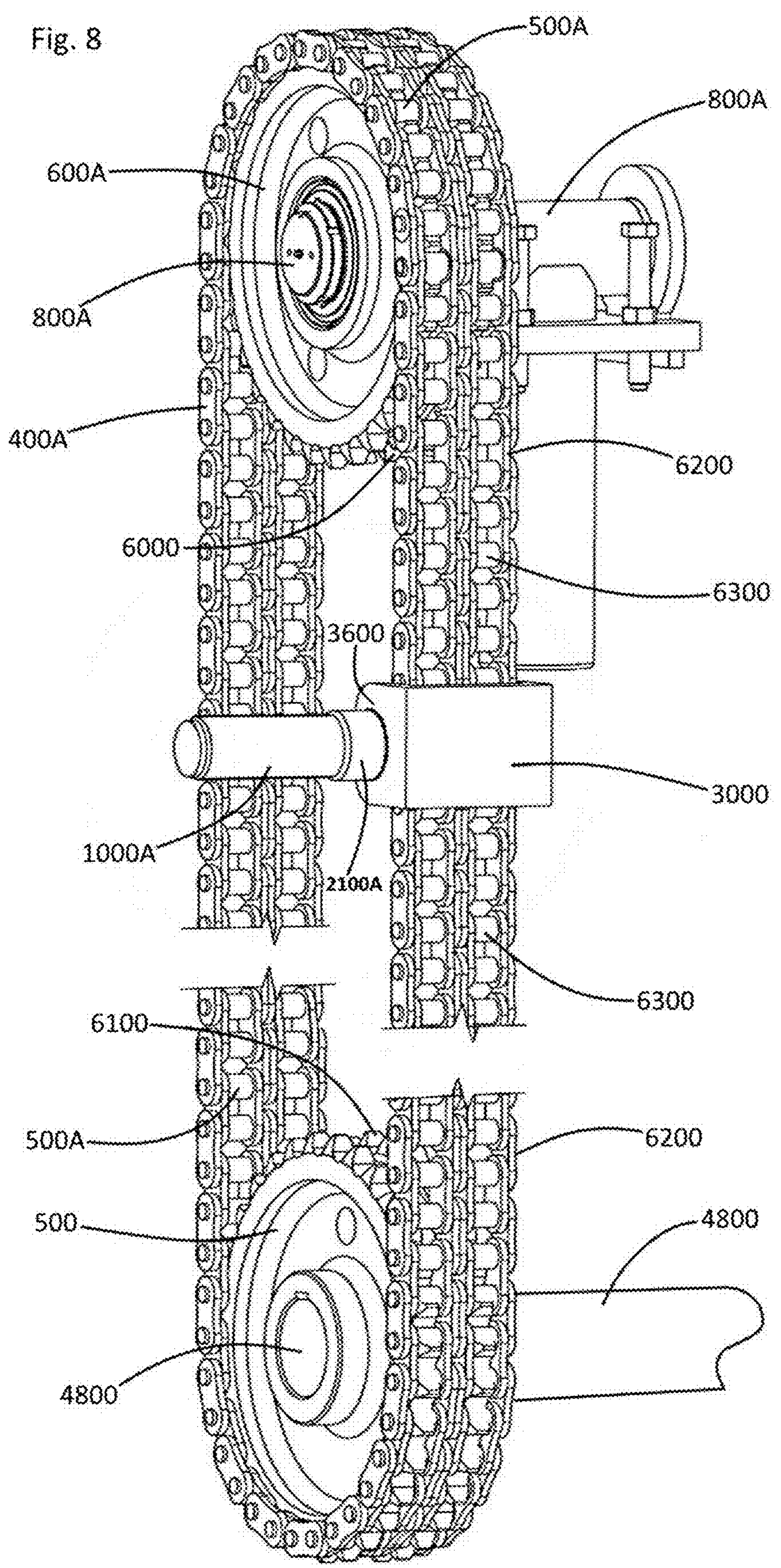
FIG. 8 is a perspective view of chain drive, knuckle attachment, and trolley axle components of a similar, though alternative, embodiment of the instant invention.

Referring simultaneously to FIGS. 8-10, the instant inventive assembly incorporates, similarly with the FIG. 7 prior art assembly, at least a first or forward continuous loop chain 400A which is cyclically driven by a rotary power input shaft 4800. An internal combustion engine 7400 is mounted upon a base or skid 7600, such engine 7400 having its power translated to the rotary power input shaft 4800 by a speed reducing gear transmission 7500. A multiply toothed lower drive sprocket 5000 is rigidly and fixedly mounted to the forward end of the input shaft 4800, such sprocket 5000 driving and cycling the forward continuous loop chain 400A. Such chain is preferably composed of a multiplicity of paired inner and outer plates which are interlinked by a multiplicity of cross pins or axles 500A. Each pin 500A may internally comprise an outer sleeve roller, an inner bushing (not shown in views), and an inner axle shaft (not shown in views) combination. The upper axle 800A is necessarily fixedly supported at the upper end of the pumping rig's derrick or tower 6400. In the suitable embodiment, such support is achieved via incorporation of the hydraulic and screw actuated position adjusting components 902 and 1702 as depicted in FIG. 4.

The forward end of the upper axle 800A supports upper idler sprockets 600A and the assembly's forward continuous loop chain 400A (or forward aspect of duplex chain 400A, 6200) extends over the upper aspect of idler sprocket 600A in a manner similar to its underlying engagement with the lower drive sprocket 500.

In the FIG. 9 structural alternative, the upper driven sprockets and the lower drive sprockets are longitudinally separated for carrying and cyclically powering longitudinally separated front and rear continuous loop chains 400A and 6200. Incorporation of such separate chains and sprockets is accommodated by a correspondingly longitudinally lengthened or extended knuckle 3000. Alternatively, such knuckle may be longitudinally shortened in the manner indicated in FIGS. 1, 2, 3, and 8, such dimensional shortening allowing the invention's front and rear pair of chains to be alternatively configured as a single duplex chain as depicted in FIG. 8. In the duplex chain alternative configuration the invention's longitudinally aligned pairs of chain cross pins 500A and 6300 may be unitary and wholly formed with each other, adding stability to the duplex configured chain and adding stability and strength to the assembly.

In order to supply a downward levering force to the rearward or distal end of the lever arm 3200 component of the knuckle 3000, a rearward continuous loop chain 6200 is provided, such chain 6200 constituting an equivalent of a rearmost chain among the longitudinally paired chains 400A and 6200 depicted in FIG. 9. Where a duplex chain is alternatively provided, the instant invention's rearward continuous loop chain component comprises a rearward aspect or extension of such chain. Such rear chain 6200 has, similarly with the forward continuous loop chain 400A, a multiplicity of cross linking longitudinally extending pins or axles 6300. The rearward continuous loop chain 6200 extends about and cycles over an upper rearward idler sprocket 6000, and under a lower rearward drive sprocket 6100. In a suitable embodiment, the lower rearward drive sprocket 6100 functions as a second drive sprocket. Suitably, such sprocket may alternatively comprise an idler sprocket. In a suitable embodiment, the upper rear sprocket 6000 comprises an idler sprocket. Referring simultaneously to FIGS. 2 and 8, such sprockets 600A, 6000, 6000, 6100 may be alternatively configured to incorporate upper and lower unitary hubs as in FIG. 2's duplex chain guiding sprocket configuration.

Figure 11:
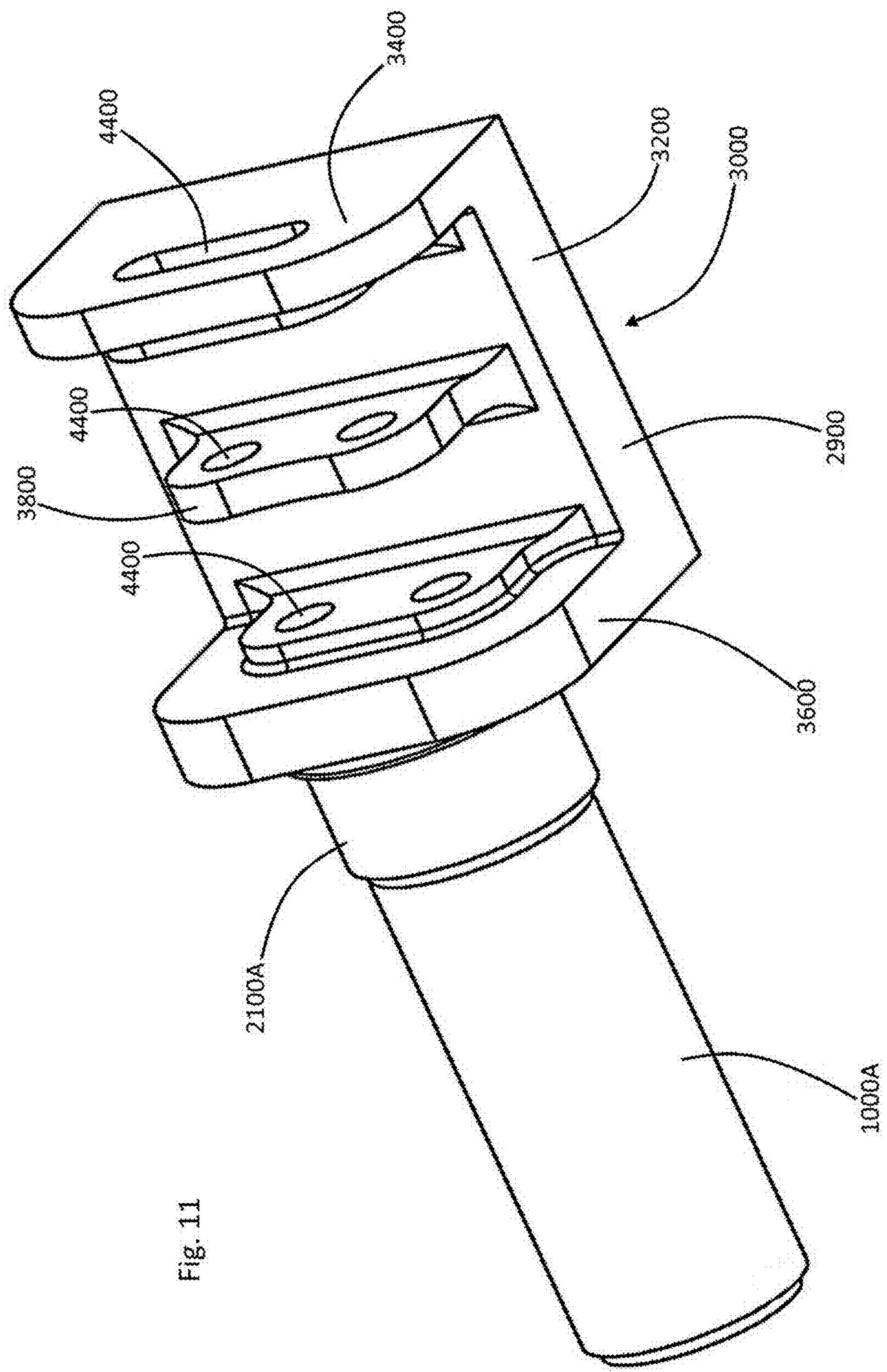
FIG. 11 is a perspective view of alternative knuckle and axle components of the instant inventive assembly.
Figure 12:
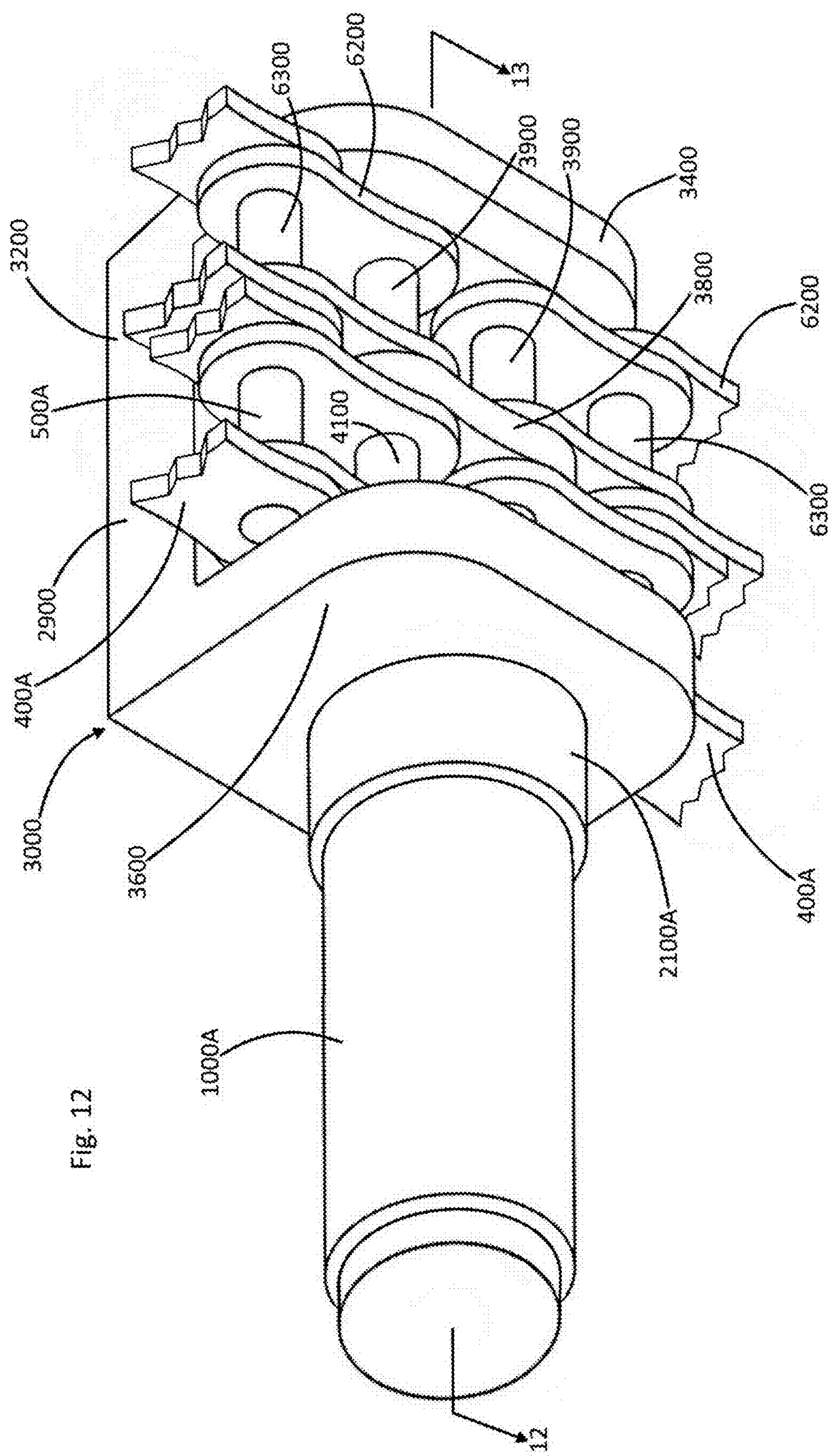
FIG. 12 is an alternative perspective view of knuckle and axle components of FIG. 12, the view further showing duplex chain configured front and rear continuous loop chain components.
Figure 13:
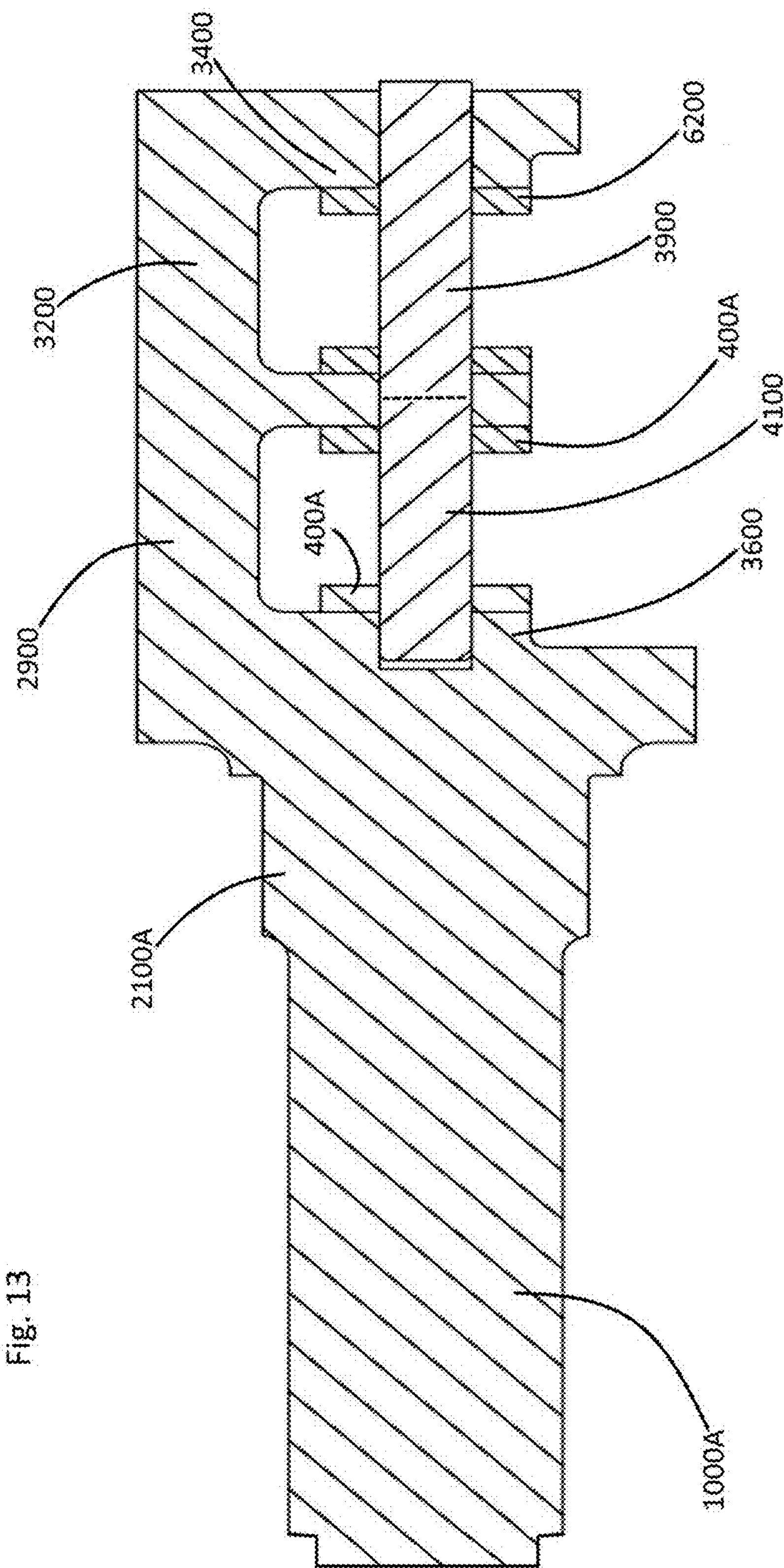
FIG. 13 is a sectional view as indicated in FIG. 12.

Referring further simultaneously to FIGS. 11-13, the modified knuckle 3000 of the instant inventive assembly suitably includes a series of cross pin receiving eyes 4400 which extend through and open longitudinally at the knuckle's "C" bracket flanges 3400, 3800, and 3600. Cross pins 3900 and 4100 extend longitudinally through the eyes 4400 of the modified knuckle 3000, such pins linking the forward and rearward continuous loop chains 400A and 6200 with flanges 3400, 3600, and 3800. In the FIG. 13 embodiment, each forward cross pin 4100 is fixedly attached to or formed wholly with one of the rearward cross pins 3900, such wholly formed attachments being designated by the broken line drawn upon pins 3900,4100. Where the effective length of rearwardly extending lever arm component 3200 is increased by increasing the longitudinal dimension of the knuckle 3000, as described above, the cross pins 3900 and 4100 may be alternatively configured as longitudinally separated segments.

In operation of the lever arm component 3200 of knuckle 3000 of the instant inventive assembly, downwardly directed tension exerted by the rearward continuous loop chain 6200 against the upper aspect of the upper rearward idler sprocket 6000 effectively prevents upwardly directed forces applied to pin 3900 from raising such pin upwardly from its seated position within valleys formed between adjacent pairs of such sprocket's upwardly extending teeth. Accordingly, the rear chain's tension effectively holds the pin 39 at its seated position depicted in FIG. 10.

While the pin 3900 is fixed at the horizontal FIG. 10 position, downwardly directed forces exerted by counterweight 200A and by the underlying trolley assembly 700A against axle 1000A tend to drive the lever arm 3200 upwardly, causing such arm to pull the pin 3900 upwardly. Such levering action utilizes the contacts of the forward pins 4100 against the forward idler sprocket 600A as a levering fulcrum. Where the rear chain 6200 (or the rear aspect of duplex chain 400A,6200) is sufficiently tensioned, such counterweight driven levering action is advantageously opposed, reducing or eliminating the upward displacement of the pin 3900 from its seated position upon the upper rearward idler sprocket 6000. Accordingly, the tension of chain 6200 effectively actuates the rearwardly extending lever arm 3200 to perform a levering function which substantially maintains the axle 1000A in the desired horizontal orientation while the forward end of such axle bears the combined weight of the roller trolley 700A, the trolley frame 2800A, and the counterweight 200A.

In further operation of the instant invention's lever arm component, upon a downward passage of the inventive knuckle 3000 to a position underlying the lower drive sprockets 5000 and 6100, similar tensioning of the forward continuous loop chain 400A may advantageously upwardly pull the forward end of the lever arm component 3200, such levering effect utilizing the rearward or distal contact of pins 3900 with sprocket 6100 as an alternative rearward fulcrum. Accordingly, the instant inventive assembly further maintains substantial horizontal extension of axle 1000A and prevents bearing wear at the lower end of the knuckle's cyclical travel.

During the flights of the instant invention's knuckle 3000 between the upper and lower sprockets 600A and 5000, tension exerted by the forward continuous loop chain 400A may provide some resistance to out-of-axis deflections of the axle 1000A. This is especially true where the knuckle utilizes a pair of pins to effect the attachment of the knuckle to the chain 400A. However, the necessarily short dimension of the knuckle in the direction of the chain's cyclical travel tends to minimize and make insufficient such deflection resistance. The instant inventive assembly supplies needed horizontal cantilevering force to the axle 1000A during its passages between the upper and lower sprockets via the rearward extension and attachment of lever arm 3200 to the rear chain 6200. During such passages, arm 3200 holds axle 1000A in the desired substantially horizontal extension by utilizing flanges 3600 and 3800 as a further alternative levering fulcrum. Where the selected pair of chains is alternatively configured as a duplex chain, additional resistance to skewing and deflection of the axle 1000A is provided during such upward and downward flights.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. A lifting mechanism for a belt-type pumping unit, comprising:

(a) longitudinally paired drive sprockets;

(b) longitudinally paired driven sprockets;

(c) a stroke adjusting bracket comprising a fixed support and a lifting support, the stroke adjusting bracket supporting the driven sprockets;

(d) a hydraulic cylinder connecting the fixed and lifting supports;

(e) front and rear continuous loop chains operatively connected with the drive sprockets and the driven sprockets; and (f) a tensioning mechanism mounted on the lifting support wherein the drive sprockets and the driven sprockets are provided with circumferential arrays of chain engaging teeth, wherein the continuous loop chains incorporate a knuckle, and wherein each of the continuous loop chains comprises a plurality of interconnected quick-to-disassemble sections, wherein the driven sprockets are rationally mounted on a driven sprocket axle, where the driven sprocket axle is mounted on the stroke adjusting bracket by the tensioning mechanism, wherein the tensioning mechanism comprises a base mounted on a lifting support seat in running fit with the driven sprocket support axle, wherein a plurality of uniformly distributed threaded apertures is formed in an axle seat, wherein a plurality of support adjusting bolts are mounted in threaded connection to the threaded apertures, and wherein the base and the axle seat are connected by the support adjusting bolts.

2. A lifting mechanism for a belt-type pumping unit, comprising:

(a) longitudinally paired drive sprockets;

(b) longitudinally paired driven sprockets;

(c) a stroke adjusting bracket for supporting the driven sprockets; and (d) front and rear continuous loop chains operatively connected with the drive sprockets and the driven sprockets, wherein the drive sprockets and the driven sprockets are provided with circumferential arrays of chain engaging teeth, wherein the continuous loop chains incorporate a knuckle, wherein each of the continuous loop chains comprises a plurality of interconnected quick-to-disassemble sections, wherein the knuckle comprises a base plate and wherein a triple of flange plates is fixedly attached to and extends from the base plate, and further comprising an axle perpendicularly connected to a forward-most flange plate among the triple of flange plates, wherein chain openings fitted to the chains are formed between adjacent pairs of the flange plates, and further comprising at least a first chain axle aperture formed in each of the flange plates.

3. The lifting mechanism for the belt-type pumping unit of claim 2, wherein the front and rear continuous loop chains comprise a duplex chain.

4. The lifting mechanism of the belt-type pumping unit of claim 3 wherein the drive sprockets comprise a unitary hub and the driven sprockets comprise a second unitary hub.

5. An assembly for balancing torsion forces within a long stroke oil pumping rig's roller trolley, the assembly comprising:

(a) an axle having forward and rearward ends, wherein the roller trolley is mounted rotatably upon the axle's forward end;

(b) a knuckle fixedly attached to the rearward end of the axle, the knuckle comprising forward and rearward "C" brackets;

(c) a forward chain drive assembly, the forward knuckle's forward "C" bracket operatively engaging the forward chain drive assembly;

(d) a lever arm fixedly attached to and extending rearwardly from the knuckle's forward "C" bracket, the rearward "C" bracket being fixedly attached to or formed wholly with the lever arm; and (e) a rearward chain drive assembly, the knuckle's rearward "C" bracket operatively engaging the rearward chain drive assembly.

6. The assembly of claim 5 wherein the forward and rearward chain drive assemblies comprise a duplex chain.

7. The assembly of claim 5 wherein each "C" bracket comprises a web and a pair of flanges.

8. The assembly of claim 7 wherein the rearward "C" bracket comprises a web, the lever arm comprising said web.

9. The assembly of claim 8 wherein each pair of flanges comprises a forward flange and a rearward flange.

10. The assembly of claim 9 wherein the rearward "C" bracket's forward flange comprises the forward "C" bracket's rearward flange.

11. The assembly of claim 10 further comprising at least a first longitudinally aligned series of pin receiving eyes, wherein each eye among said series of eyes extends through one of the "C" brackets' flanges.

12. The assembly of claim 11 wherein the forward and rearward chain drive assemblies respectively comprise forward and rearward multiplicities of plate connector pins, wherein at least one of the pins among the forward multiplicity of plate connector pins extends through pin receiving eyes within the forward "C" bracket's flanges, and wherein at least one of the pins among the rearward multiplicity of pins extends through pin receiving eyes within the rearward "C" bracket's flanges.

13. The assembly of claim 12 wherein the at least one pins are rigidly attached to each other in longitudinal alignment with each other.

14. The assembly of claim 12 wherein the forward and rearward chain drive assemblies comprise forward and rearward pairs of chain engaging sprockets.

15. The assembly of claim 14 wherein each pair of chain engaging sprockets comprises a unitary hub.

* * * * *